US012282135B2

(12) United States Patent
Singer

(10) Patent No.: US 12,282,135 B2
(45) Date of Patent: Apr. 22, 2025

(54) NUCLEAR MAGNETIC RESONANCE BASED ARCHIE PARAMETER DETERMINATION

(71) Applicant: Halliburton Energy Services, Inc., Houston, TX (US)

(72) Inventor: Gabriela Singer, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/455,157

(22) Filed: Nov. 16, 2021

(65) Prior Publication Data

US 2023/0152483 A1 May 18, 2023

(51) Int. Cl.
*G01V 3/14* (2006.01)
*E21B 49/00* (2006.01)
*G01V 3/38* (2006.01)

(52) U.S. Cl.
CPC ............... *G01V 3/14* (2013.01); *E21B 49/00* (2013.01); *G01V 3/38* (2013.01)

(58) Field of Classification Search
CPC ............ G01V 3/14; G01V 3/38; E21B 49/00
See application file for complete search history.

(56) References Cited

U.S. PATENT DOCUMENTS

| | | | |
|---|---|---|---|
| 2011/0004448 A1* | 1/2011 | Hurley | G06T 17/00 702/179 |
| 2012/0065888 A1 | 3/2012 | Wu et al. | |
| 2013/0057277 A1* | 3/2013 | Zielinski | G01V 3/32 324/303 |
| 2014/0318232 A1 | 10/2014 | Pairoys | |
| 2016/0266269 A1* | 9/2016 | Wilson | G01V 3/30 |
| 2016/0334346 A1 | 11/2016 | Cao Minh et al. | |
| 2017/0145804 A1* | 5/2017 | Wessling | G01V 11/00 |
| 2018/0003786 A1* | 1/2018 | Washburn | G01N 23/04 |
| 2018/0120468 A1* | 5/2018 | Seleznev | G01V 3/20 |
| 2022/0035065 A1* | 2/2022 | Tang | G06Q 50/02 |
| 2022/0205937 A1* | 6/2022 | Valori | G01V 3/38 |

OTHER PUBLICATIONS

Chanh Cao Minh, "Determination of wettability from magnetic resonance relaxation and diffusion measurements on fresh-state cores", SPWLA 56th Annual Logging Symposium, Jul. 18-22, 2015 (Year: 2015).*

Brunauer, et al., "Adsorption of Gases in Multimolecular Layers", Journal of the American Chemical Society, vol. 60, Issue 2, Feb. 1, 1938, pp. 309-319.

(Continued)

*Primary Examiner* — Catherine T. Rastovski
*Assistant Examiner* — Yossef Korang-Beheshti
(74) *Attorney, Agent, or Firm* — DeLizio, Peacock, Lewin & Guerra LLP

(57) ABSTRACT

A method comprises determining a Nuclear Magnetic Resonance (NMR) response of a subsurface formation that is based on an NMR response signal that traversed through the subsurface formation and that is result of a magnetic field being emitted into the subsurface formation; determining an Archie cementation exponent for an Archie equation based on the NMR response; and determining a property of the subsurface formation based on the Archie cementation exponent.

20 Claims, 7 Drawing Sheets

(56) References Cited

OTHER PUBLICATIONS

Chen, et al., "Determination of Grain Size Distribution From NMR Relaxation Time Using Pore Scale Modeling", SCA2007-49, International Symposium of the Society of Core Analysts, Calgary, Canada, Sep. 10, 2007, pp. 1-6.

Hürlimann, et al., "Restricted Diffusion in Sedimentary Rocks. Determination of Surface-Area-to-Volume Ratio and Surface Relaxivity", Journal of Magnetic Resonance, Series A, vol. 111, Issue 2, Dec. 1, 1994, pp. 169-178.

Kenyon, et al., "A Laboratory Study of Nuclear Magnetic Resonance Relaxation and its Relation to Depositional Texture and Petrophysical Properties—Carbonate Thamama Group, Mubarraz Field, Abu Dha", SPE-29886-MS, Middle East Oil Show, Bahrain, Mar. 11, 1995.

Ma, et al., "Objective-Driven Solid-Surface-Roughness Characterization for Enhanced Nuclear-Magnetic-Resonance Petrophysics", Society of Petroleum Engineers Journal, vol. 26, Issue 05, SPE-201689-PA, Oct. 13, 2021, 25 pages.

Nordin, et al., "The effect of surface roughness on Nuclear Magnetic Resonance relaxation", The Open-Access Journal for the Basic Principals of Diffusion Theory, Experiment, and Application, vol. 26, Dec. 18, 2015, 11 pages.

Zielinski, et al., "Restricted Diffusion Effects in Saturation Estimates from 2D Diffusion-Relaxation NMR Map", Society of Petroleum Engineers Annual Technical Conference and Exhibition, Florence, Italy, SPE-134841-MS, Sep. 19, 2010, 8 pages.

"PCT Application No. PCT/US2021/072471, International Search Report and Written Opinion", Aug. 11, 2022, 11 pages.

Cao Minh, et al., "Determination of WETTABILITY from magnetic resonance relaxation and diffusion measurements on fresh-state cores", SPWLA 56th Annual Logging Symposium, Long Beach CA, USA, Jul. 18, 2015, 16 pages.

Banavar, et al., "Chapter IV: Mechanical Properties", American Institute of Physics Conference Proceedings 154: Physics and Chemistry of Porous Media II, New York, 1987, 73 pages.

Pengra, et al., "Determination of rock properties by low-frequency AC electrokinetics", Journal of Geophysical Reseach, vol. 104, No. B12, Dec. 10, 1999, pp. 29,485-29,508.

Wong, et al., "Conductivity and permeability of rocks", Physical Review B, vol. 30, No. 11, Dec. 1, 1984, 11 pages.

\* cited by examiner

NUCLEAR MAGNETIC RESONANCE BASED ARCHIE PARAMETER DETERMINATION

BACKGROUND

This disclosure generally relates to exploration and production of hydrocarbons in subsurface formations, and more particularly, to formation evaluation that includes determination of an Archie parameter (e.g., cementation exponent) that is based on nuclear magnetic resonance (NMR).

There are a number of approaches to perform formation evaluation of subsurface formations as part of hydrocarbon recovery operations from such formations. One approach includes determining an effective conductivity of a formation using Archie's law. Conventional approaches use electrical methods to measure an Archie cementation exponent, m, of core samples in a laboratory that have been brought to the surface. However, obtaining core samples from each drilled well to study in the laboratory can be expensive.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, well-known instruction instances, protocols, structures and techniques have not been shown in detail in order not to obfuscate the description.

Example embodiments relate to formation evaluation that can include determining an electrical conductivity of a subsurface formation based on the porosity of the rock, water saturation, and conductivity of the formation. For example, a model known as Archie's equation (also known as Archie's relation or Archie's equation) can be used to make this determination.

Rock resistivity of formations can be used to estimate hydrocarbon reserves in such formation. The rock resistivity can be used in conjunction with other measurements to estimate the porosity and the water saturation of the formation. For brine-saturated rocks, the solid matrix can be insulating and the fluid conductive. A model known as Archie's equation (also known as Archie's relation or Archie's equation) can provide an empirical correlation between resistivity and porosity of the formation, as set forth below in Equation (1). One parameter of Archie's equation is a cementation exponent (m). Example embodiments can determine the cementation exponent from Nuclear Magnetic Resonance (NMR) response data. For example, the cementation exponent can be determined from diffusion coefficient and transverse relaxation time (D-$T_2$) data.

In some embodiments, the surface relaxivity, p, of the formation is also used as part of determining the cementation exponent. The surface relaxivity for a specific rock type can be available from previous studies, where is calibrated for a rock type. The surface relaxivity for a specific rock type can be measured in the laboratory on core plug samples or can be measured in the laboratory on drill cuttings. Thus, in contrast to conventional approaches, example embodiments can determine cementation exponent (m) from NMR response data. Also, if not readily known, the surface relaxivity can be measured from drill cuttings, instead of using core plugs.

Also, example embodiments can be applied in various configurations and applications. For example, some embodiments can be applied to NMR diffusion maps from log measurements. Thus, example embodiments can allow for monitoring the changes in the cementation exponent directly from logs. The correct values of the cementation exponent can be used in various types of formation evaluation. For example, these values can be used for interpretation of water saturation, porosity, etc. from resistivity logs. Additionally, some embodiments can be used in core analysis, in the laboratory, etc.

Example Systems

Figure 1A:
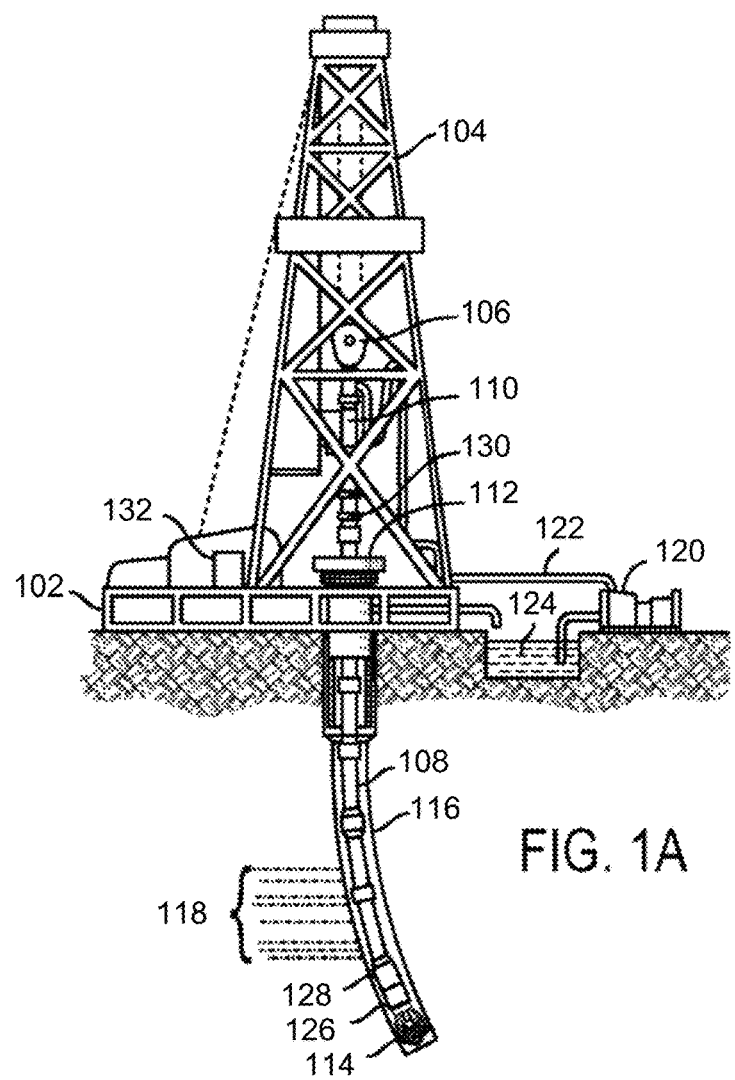
FIG. 1A depicts an example logging while drilling (LWD) system, according to some embodiments.

Two example systems to determine the Archie cementation exponent using NMR responses are now described. FIG. 1A depicts an example logging while drilling (LWD) system, according to some embodiments. A drilling platform 102 supports a derrick 104 having a traveling block 106 for raising and lowering a drill string 108. A kelly 110 supports the drill string 108 as it is lowered through a rotary table 112. A drill bit 114 is driven by a downhole motor and/or rotation of the drill string 108. As the drill bit 114 rotates, it creates a wellbore 116 that passes through various formations 118. A pump 120 circulates drilling fluid through a feed pipe 122 to the kelly 110, downhole through the interior of the drill string 108, through orifices in the drill bit 114, back to the surface via the annulus around the drill string 108, and into a retention pit 124. The drilling fluid transports cuttings from the borehole into the retention pit 124 and aids in maintaining the borehole integrity.

An NMR logging tool 126 can be integrated into the bottom-hole assembly near the drill bit 114. As the drill bit 114 extends the wellbore 116 through the formations 118, the bottom-hole assembly collects NMR measurements relating to spin relaxation time (e.g., T1, T2, etc.) distributions, as well as various other formation properties and information regarding tool orientation and various other drilling conditions. The NMR logging tool 126 may take the form of a drill collar (i.e., a thick-walled tubular that provides weight and rigidity to aid the drilling process). The NMR logging tool 126 can also include one or more navigational packages for determining the position, inclination angle, horizontal angle, and rotational angle of the tool. Such navigational packages can include, for example, accelerometers, magnetometers, and/or sensors.

For purposes of communication, a downhole telemetry sub 128 can be included in the bottom-hole assembly to transfer measurement data to a surface receiver 130 and to receive commands from the surface. Mud pulse telemetry is one common telemetry technique for transferring tool measurements to surface receivers and receiving commands from the surface, but other telemetry techniques can also be used. In some embodiments, the telemetry sub 128 can store logging data for later retrieval at the surface when the logging assembly is recovered.

At the surface, the surface receiver 130 can receive the uplink signal from the downhole telemetry sub 128 and can communicate the signal to a data acquisition module 132. The data acquisition module 132 can include one or more processors, storage mediums, input devices, output devices, software, etc. The data acquisition module 132 can collect, store, and/or process the data received from the NMR logging tool 126 to determine characteristics (e.g., porosity, pore size distribution, permeability, hydrocarbon saturation, etc.) of the formations 118 (as further described herein). For example, the Archie cementation exponent using NMR diffusion can be determined and then used to determine various formation characteristics.

Figure 1B:
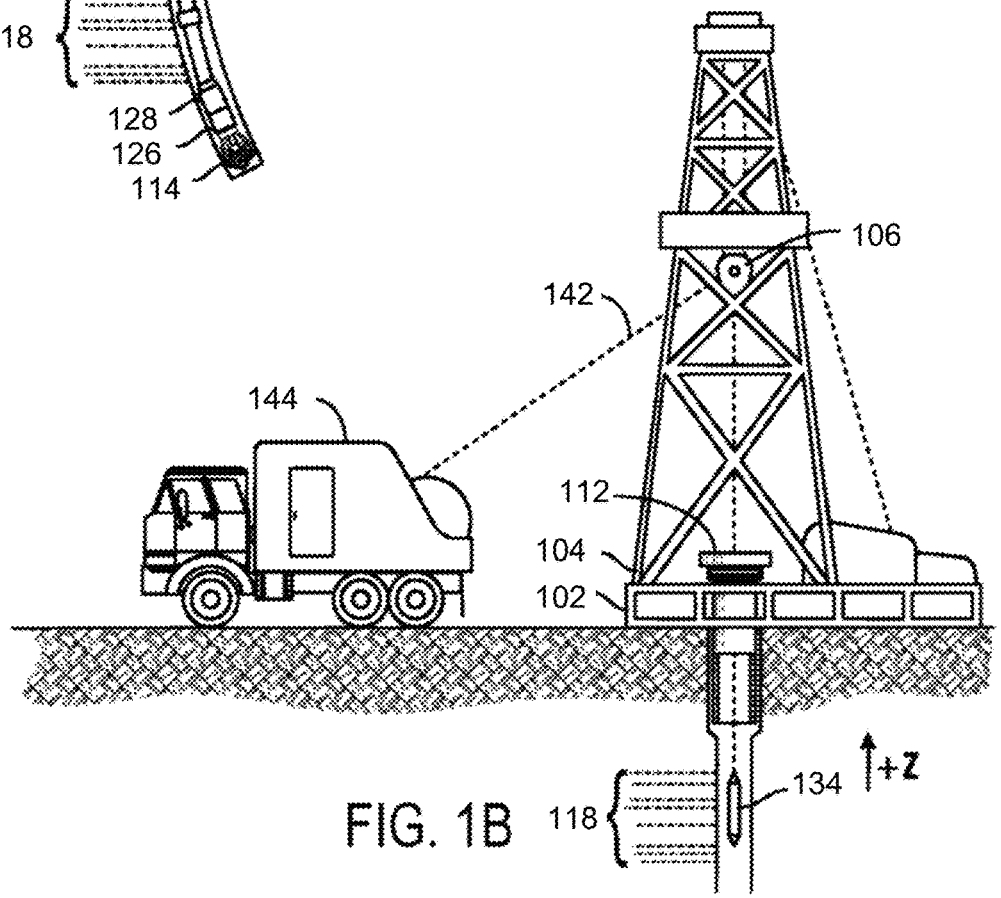
FIG. 1B depicts an example wireline system, according to some embodiments.

At various times during the drilling process, the drill string 108 may be removed from the borehole as shown in FIG. 1B. In particular, FIG. 1B depicts an example wireline system, according to some embodiments.

Once the drill string has been removed, logging operations can be conducted using a wireline logging tool 134 (i.e., a sensing instrument sonde suspended by a cable 142 having conductors for transporting power to the tool and telemetry from the tool to the surface). The wireline logging tool 134 may have pads and/or centralizing springs to maintain the tool near the central axis of the borehole or to bias the tool towards the borehole wall as the tool is moved downhole or uphole. The wireline logging tool 34 can also include one or more navigational packages for determining the position, inclination angle, horizontal angle, and rotational angle of the tool. Such navigational packages can include, for example, accelerometers, magnetometers, and/or sensors. In some embodiments, a surface measurement system (not shown) can be used to determine the depth of the wireline logging tool 134.

As explained further below, the wireline logging tool 134 can include an NMR logging instrument that collects NMR measurements associated with the formations 118 within the wellbore 116. A logging facility 144 includes a computer, such as those described with reference to FIG. 7, for collecting, storing, and/or processing the measurements gathered by the wireline logging tool 134 (e.g., to determine characteristics such as porosity, pore size distribution, permeability, and/or hydrocarbon saturation of the formations 118).

Although FIGS. 1A and 1B depict specific borehole configurations, it should be understood by those skilled in the art that the present disclosure is equally well suited for use in wellbores having other orientations including vertical wellbores, horizontal wellbores, slanted wellbores, multilateral wellbores and the like. Also, even though FIGS. 1A and 1B depict an onshore operation, it should be understood by those skilled in the art that the present disclosure is equally well suited for use in offshore operations. Moreover, it should be understood by those skilled in the art that the present disclosure is not limited to the environments depicted in FIGS. 1A and 1B, and can also be used, for example, in other well operations such as non-conductive production tubing operations, jointed tubing operations, coiled tubing operations, combinations thereof, and the like.

Cementation Exponent (m)

Rock resistivity for a formation can be used to estimate or determine the amount of hydrocarbons in the formation. The rock resistivity can used in conjunction with other measurements to estimate the porosity and the water saturation of the formation. For brine-saturated rocks, the solid matrix is insulating, and the fluid is conductive. The empirical correlation between resistivity and porosity is known as the Archie's relation and is set forth in Equation (1) below:

$$R_0 = FR_w \approx \frac{1}{\phi^m} R_w \qquad (1)$$

where $R_0$ is the resistivity of the fully brine saturated rock, $R_w$ is the resistivity of brine, F is the formation factor, $\phi$ is the porosity and m is Archie cementation exponent. For example for sandstone, it was determined that the Archie cementation exponent is m≈2. However, the Archie cementation exponent needs to be determined for each particular field or formation being evaluated. The cementation exponent is closely connected to the rock properties which are not universal.

The cementation exponent can be calculated by Equation (2):

$$m = \frac{\log \frac{R_w}{R_0}}{\log \phi} \qquad (2)$$

The variations in m can be large enough to affect the interpretation of water saturation from resistivity logs which can result in using values of m which are not correct in the Archie's equation. To illustrate, water saturation ($S_w^n$) can be calculated using Equation (3):

$$S_w^n = \frac{a}{\phi^m} \frac{R_w}{R_t} \qquad (3)$$

where n is the saturation exponent, a≈1 a constant, and $R_t$ is the formation resistivity. The variations in m are large enough to affect the interpretation of water saturation from resistivity logs. Thus, the interpretation of water saturation can be incorrect if the value of the cementation exponent, m, which are not correct in the Archie's equation.

Example embodiments can include a new approach for accurately estimating or determining m. In some embodiments, this approach can include estimating m from an NMR response and surface relaxivity. For example, m can be estimated or determined from D-$T_2$ maps generated from an NMR response. For instance, fully brine saturated cores can be used for estimating the cementation exponent, m, by using a truncated singular value decomposition (SVD) with a regularization parameter.

In some embodiments, at short diffusion times, the diffusion coefficient D(t) can deviate from the bulk molecular diffusion coefficient of the fluid, $D_0$, by a term proportional to the surface-to-volume ratio, $S/V_p$. This is known as restricted diffusion. At long diffusion times, when the diffusion length is large compared with the heterogeneity length-scale of the pore space, the spins can probe the connectivity of the pore space and the diffusion coefficient can approach the diffusion coefficient in the tortuosity limit given by Equation (4):

$$\tau = F\phi = \phi^{1-m} \quad (4)$$

As the diffusion coefficient D(t) tends to approach $D_\infty$, the diffusion coefficient in the tortuosity limit is given by Equation (5):

$$D(t) \to D_\infty = \frac{D_o}{\tau} \quad (5)$$

An expression for D(t) that can interpolate between the short-time behavior and the long-time asymptotic value of $1/\tau$. The time-dependent D(t) for short times and long times can be connected using the Padé approximation. The D-$T_2$ based cementation exponent, m, based on D-T2 can then be determined based on Equation (6):

$$\frac{D(T_{2S})}{D_0} = 1 - \gamma \frac{\alpha L_D}{\alpha L_D + \gamma} \quad (6)$$

where Equations (7)-(9) define the following variables of Equation (6):

$$\gamma = 1 - \frac{D_\infty}{D_0} = 1 - \frac{1}{\tau} = 1 - \phi^{m-1} \quad (7)$$

$$L_D = \sqrt{D_0 t_D} \quad (8)$$

$$\alpha = \frac{4}{9\sqrt{\pi}} \frac{1}{T_{2S} \rho_{DT_2}} \quad (9)$$

where $D_0$ is the bulk diffusion coefficient of the fluid, $D_\infty$ is D(t) in the tortuosity limit, and $t_D$ the diffusion time, i.e., the time the molecules are allowed to diffuse. The cementation exponent, m, can then be estimated from the Padé D-$T_2$ phenomenological fit to restricted-diffusion versus T2 (Equation 6), when the surface relaxivity and porosity are known. In some embodiments, this determination can be made based on a BET (Brunauer, Emmett, and Teller) surface area measurement using gas (such as nitrogen) as the adsorbate. However, when the pore grain surface is rough, the specific surface area (surface area per unit sample weight) of rough surfaces would be larger than that of smooth surfaces and therefore the surface relaxivity value from BET, $\rho_{BET}$, can be underestimated.

In a first example, in a brine saturated rock with $\phi$=23.4 p.u., $D_0$=2.6×10−9 m2/s at 30° C., the diffusion time $t_D$=50 ms and surface relaxivity, $\rho$=29.84 μm/s, the Padé D-T2 fit line that gives the best fit to the D-T2 distribution (i.e., that goes through the peak of the distribution) is for m=2 (FIG. 1).

Surface Relaxivity

Different examples of measuring surface relaxivity of a formation are now described. Depending on the method, the surface relaxivity can vary by orders of magnitude. One example for determining NMR surface relaxivity is based on the classical BET (Brunauer, Emmett, and Teller) surface area measurement using nitrogen gas as the adsorbate.

However, when the pore grain surface is rough, the specific surface area (surface area per unit sample weight) of rough surfaces would be larger than that of smooth surfaces and therefore the surface relaxivity value from BET, $\rho_{BET}$, is underestimated. The $\rho_{BET}$ value is mineralogy and surface chemistry dependent, it. Also, the $\rho_{BET}$ value parameterizes the strength of the interaction between fluid nuclear spins and the smooth pore wall. To extract correct data regarding hydrocarbons from the data, the effect of surface roughness should also be considered.

In some implementations, a roughness corrected surface relaxivity is the surface relaxivity from BET surface measurement multiplied by a factor that depends on the surface roughness, R, given by Equation (10):

$$\rho_{LSCM} = \rho_{BET}(1+2R) \quad (10)$$

wherein R is the surface roughness, which can be calculated based on the ratio of rough surfaces to that of smooth surfaces, given by Equation (11):

$$R = S_{true}/S_{geometric} \quad (11)$$

In some embodiments, R can be measured from a laser Confocal Scanning Microscope (LSCM).

A second example for determining surface relaxivity is based on gas adsorption and BET. For example, surface relaxivity can be determined using the Brunauer, Emmett, and Teller (BET) surface area measurement using nitrogen gas as the adsorbate. For instance, a BET relation for surface area measurements can be given by Equation (12):

$$\frac{1}{W\left(\left(\frac{P_0}{P}\right)-1\right)} = \frac{1}{W_m C} + \frac{C-1}{W_m C}\left(\frac{P}{P_0}\right) \quad (12)$$

where W is the weight of gas adsorbed, $P/P_0$ is the relative pressure, $W_m$ is the weight of adsorbate as monolayer, and C is the BET constant. The specific surface area ($S_g$) can be given (in units of m²/g) by Equation (13):

$$S_g = \frac{W_m N_A A_{CS}}{M_g M} \quad (13)$$

where $N_A$ is the Avogadro's number (6.0323×10²³), M is the molecular weight of adsorbate, $A_{cs}$ is the adsorbate cross sectional area (16.2 Å² for $N_2$), and $M_g$ is the sample weight. The surface to pore-volume $$\left(\frac{S}{V_p}\right)$$

is then given by Equation (14):

$$\frac{S}{V_p} = \frac{1-\phi}{\phi}\frac{S}{V_g} = \frac{1-\phi}{\phi}\rho_g S_g \quad (14)$$

where $\rho_g$ is the grain density.

The surface relaxivity ($\rho_{BET}$) for $T_2$ can then calculated from Equation (1) using Equation (15):

$$\rho_{BET} = \frac{1}{T_{2,LM}}\frac{V_p}{S} \quad (15)$$

where $T_{2LM}$ is the log-mean of the $T_2$ distribution. Alternatively or in addition, the mean of the distribution in rate, $R_{2M}$, (also given by the initial slope of the $T_2$ decay) can be used in Equation (15). In some embodiments, $T_{2LM}$ is used since the analysis of the D-$T_2$ measurements below are also done on a log scale. In some embodiments, $T_{2peak}$ is used. The surface relaxivity can then be corrected for surface roughness using Equation (10) shown above.

A third example for determining surface relaxivity is based on µ-CT (pore size distribution). For example, the surface relaxivity based on µ-CT can be determined using Equation (16):

$$\rho_{CT} = \frac{d}{6T_{2,LM}} \quad (16)$$

where d is the mean pore size from µ-CT

In some embodiments, to extract correct hydrocarbon information of the subsurface formation from the NMR response, the effect of surface roughness is considered. Therefore, $\rho_{LSCM}$ or $\rho_{CT}$ can be used to determine m (instead of BET, which has values that can underestimated).

Example Operations

Figure 2:
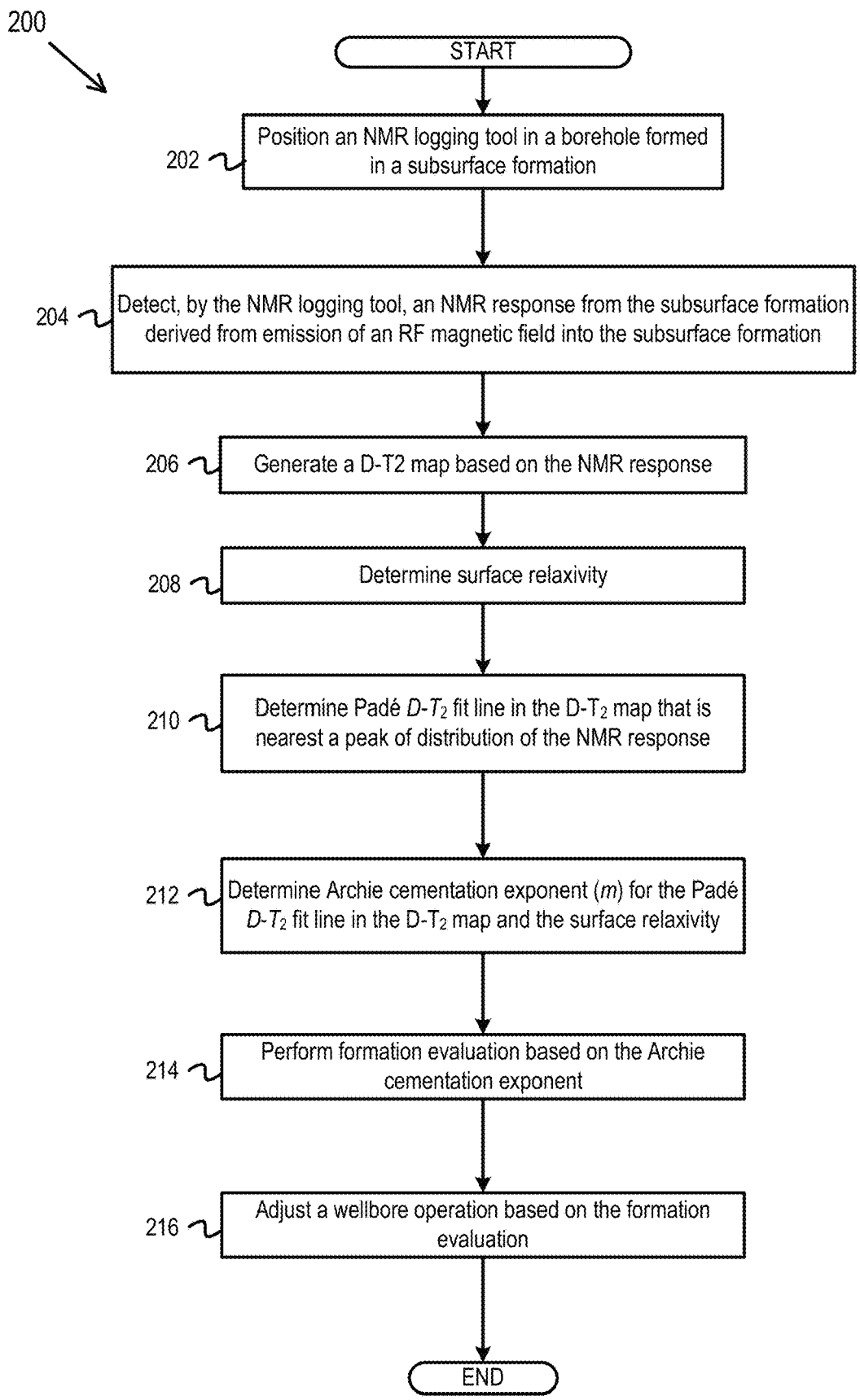
FIG. 2 depicts a flowchart of example operations for determining and using the Archie cementation exponent based on an NMR response from NMR logging, according to some embodiments.

Example operations for determining and using the Archie cementation exponent using NMR responses are now described. FIG. 2 depicts a flowchart of example operations for determining and using the Archie cementation exponent based on an NMR response from NMR logging data, according to some embodiments. FIG. 2 depicts a flowchart 200 can be performed by software, firmware, hardware or a combination thereof. Such operations are described with reference to the systems of FIGS. 1A-1B. However, such operations can be performed by other systems or components. For example, at least some of the operations of the flowchart 200 are described as being performed by a computer at a surface of the wellbore. In some embodiments, one or more of these operations can be performed by a computer downhole in the wellbore. For example, the NMR logging tool 126 or the wireline logging tool 134 can include a computer to perform one or more of these operations. The operations of the flowchart 200 start at block 202.

At block 202, an NMR logging tool is positioned in a wellbore formed in a subsurface formation. For example, with reference to FIGS. 1A-1B, the NMR logging tool 126 or the wireline logging tool 134 can be positioned in the wellbore 116 where NMR logging is to be performed.

At block 204, an NMR response is detected by the NMR logging tool and from the subsurface formation. The NMR response can be derived from emission of a radio frequency (RF) magnetic field into the subsurface formation. For example, with reference to FIGS. 1A-1B, the NMR logging tool 126 or the wireline logging tool 134 can emit the RF magnetic field into the subsurface formation.

Figure 3:
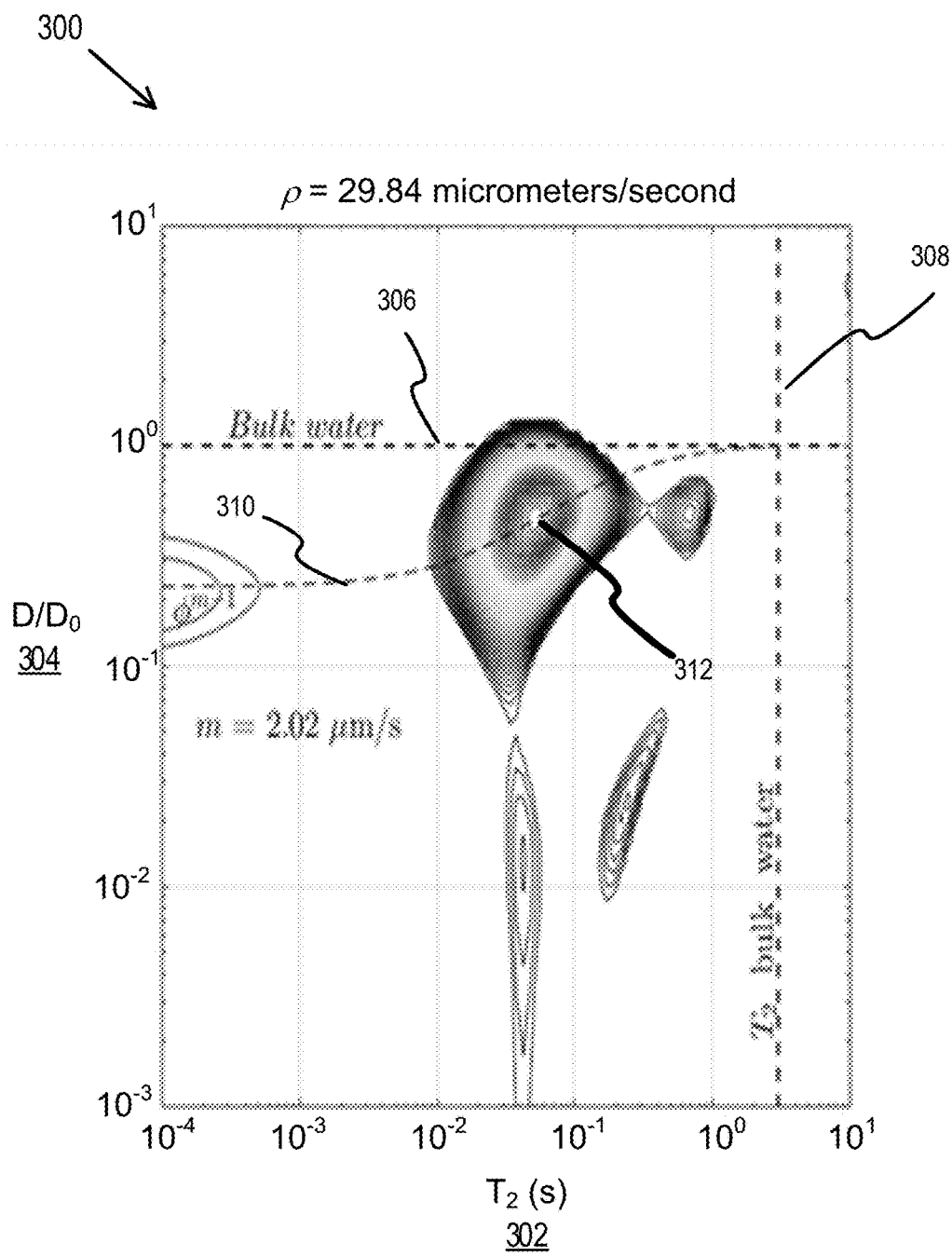
FIG. 3 depicts an example Diffusion coefficient-transverse relaxation time (D-$T_2$) map generated based on the NMR response, according to some embodiments.

At block 206, a Diffusion coefficient-transverse relaxation time (D-$T_2$) map is generated based on the NMR response. For example, with reference to FIGS. 1A-1B, a computer at the surface of the wellbore 116 can generate the D-$T_2$ map. To illustrate, FIG. 3 depicts an example diffusion coefficient-transverse relaxation time (D-$T_2$) map generated based on the NMR response, according to some embodiments. A D-$T_2$ map 300 is an example map for a subsurface formation sample having a surface relaxivity (ρ) of 29.84 micrometers (µm)/second (s) and is saturated with brine. The D-$T_2$ map 300 includes an x-axis 302 that is the transverse relaxation time ($T_2$). The D-$T_2$ map 300 includes a y-axis 304 (the diffusion coefficient (D)/the bulk diffusion coefficient ($D_0$)). The sample porosity is φ=23.4 p.u. The bulk diffusion coefficient of brine is $D_0$=2.6×10$^{-9}$ m$^2$/s at 30° C. The diffusion time $t_D$=50 ms. A line 306 is the D/$D_0$ of bulk water−10$^0$. A line 308 is the T2 of bulk water−10$^{0.5}$. The D-$T_2$ map 300 also includes a Padé D-$T_2$ fit line 310 that passes through a peak 312. Selection of the Padé D-$T_2$ fit 310 is further described below in the description of the operation at block 210. Returning to FIG. 2, operations of the flowchart 200 continue at block 208.

At block 208, NMR surface relaxivity of the subsurface formation is determined. For example, with reference to FIGS. 1A-1B, a computer at the surface of the wellbore 116 can make this determination. Different examples of determining surface relaxivity of the subsurface formation are described above.

At block 210, a Padé D-$T_2$ phenomenological fit to restricted-diffusion versus T2 is determined in the D-$T_2$ map that is nearest a peak of distribution of the NMR response. For example, with reference to FIGS. 1A-1B, a computer at the surface of the wellbore 116 can make this determination. With reference to FIG. 3, the Padé D-$T_2$ fit is the line 310 that intersects the peak of distribution (312). In some embodiments, the Padé D-$T_2$ fit is created based on Equation (6) set forth above. In Equation (6), all the terms can be known except the cementation exponent, m. Thus, cementation exponent, m, can be set for Equation (6) such that the line intersects or is nearest the peak 312. The peak 312 can be defined as the maximum intensity of the signal amplitude of the NMR response. The Padé D-$T_2$ fit line 310 that passes through the peak 312 can be selected because it is considered the best fit to the D-$T_2$ distribution (i.e., that goes through a peak 312 of the distribution). In this example, the value of m for the best fit line 310 is 2.02 µm/s. So the value of m can be 2.

At block 212, the Archie cementation exponent (m) for the Padé D-$T_2$ fit line in the D-$T_2$ map and the surface relaxivity is determined. For example, with reference to FIGS. 1A-1B, a computer at the surface of the wellbore 116 can make this determination. As described above, Equation (6) can used to determine the Archie cementation exponent (m) for the Padé D-$T_2$ fit such that the fit line intersects or is nearest the peak of the distribution.

At block 214, formation evaluation based on the Archie cementation exponent is performed. For example, with reference to FIGS. 1A-1B, a computer at the surface of the wellbore 116 can make perform the formation evaluation. For instance, the computer can determine porosity, permeability, saturation, etc. based on Archie's law and the Archie cementation exponent.

At block 216, a wellbore operation is adjusted based on the formation evaluation. For example, with reference to FIGS. 1A-1B, a computer at the surface of the wellbore 116 can perform this operation. For instance, drilling operations (such as direction, speed of the drill bit, weight on bit, etc.) can be adjusted based on the formation evaluation. Other wellbore operations can also be adjusted. For example, post drilling operations (such as production-related operations) can be adjusted based on the formation evaluation. For example, different parameters of a fracking operation can be adjusted based on the formation evaluation. Operations of the flowchart 200 are complete.

Figure 4:
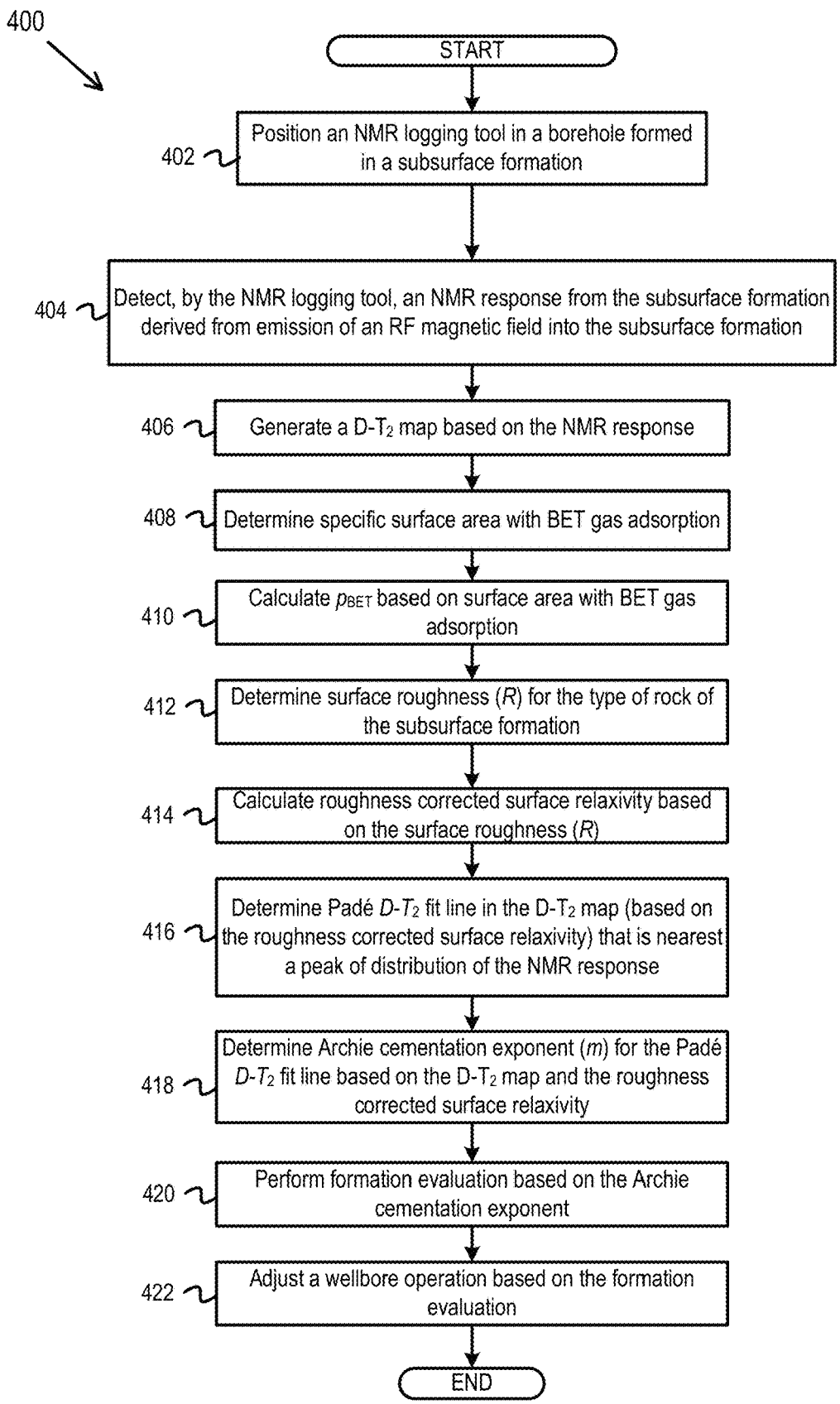
FIG. 4 depicts a flowchart of example operations for determining and using the Archie cementation exponent based on an NMR response using laser scanning confocal microscopy (LSCM), according to some embodiments.

A second example of operations for determining and using the Archie cementation exponent based on an NMR response is now described. In particular, FIG. 4 depicts a flowchart of example operations for determining and using the Archie cementation exponent based on an NMR response using laser scanning confocal microscopy (LSCM), according to some embodiments. FIG. 4 depicts a flowchart 400 can be performed by software, firmware, hardware or a combination thereof. Such operations are described with reference to the systems of FIGS. 1A-1B. However, such operations can be performed by other systems or components. For example, at least some of the operations of the flowchart 400 are described as being performed by a computer at a surface of the wellbore. In some embodiments, one or more of these operations can be performed by a computer downhole in the wellbore. For example, the NMR logging tool 126 or the wireline logging tool 134 can include a computer to perform one or more of these operations. The operations of the flowchart 400 start at block 402.

At block 402, an NMR logging tool is positioned in a wellbore formed in a subsurface formation. For example, with reference to FIGS. 1A-1B, the NMR logging tool 126 or the wireline logging tool 134 can be positioned in the wellbore 116 where NMR logging is to be performed.

At block 404, an NMR response is detected by the NMR logging tool and from the subsurface formation. The NMR response can be derived from emission of a radio frequency (RF) magnetic field into the subsurface formation. For example, with reference to FIGS. 1A-1B, the NMR logging tool 126 or the wireline logging tool 134 can emit the RF magnetic field into the subsurface formation.

At block 406, a D-$T_2$ map is generated based on the NMR response. For example, with reference to FIGS. 1A-1B, a computer at the surface of the wellbore 116 can generate the D-$T_2$ map (as described above in reference to FIG. 3).

At block 408, surface area with BET gas adsorption is determined. For example, with reference to FIGS. 1A-1B, a computer at the surface of the wellbore 116 can perform this operation. For instance, the surface area with BET gas adsorption can be determined using Equations (12)-(14) described in detail above.

At block 410, $\rho_{BET}$ is calculated based on the surface area with BET gas adsorption. For example, with reference to FIGS. 1A-1B, a computer at the surface of the wellbore 116 can perform this calculation. For instance, ABET can be calculated based on the BET gas adsorption using Equation (15) described in detail above.

At block 412, a surface roughness of the subsurface formation (R) is determined. For example, with reference to FIGS. 1A-1B, a computer at the surface of the wellbore 116 can make this determination. For instance, the surface roughness can be determined based on the type of the rock of the subsurface formation being processed. In some embodiments, the surface roughness can be determined based on the type of rock by accessing such data from a database, library, etc. that includes a surface roughness for given types of rock.

At block 414, a roughness corrected surface relaxivity based on the surface roughness (R) is calculated. For example, with reference to FIGS. 1A-1B, a computer at the surface of the wellbore 116 can perform this calculation. For instance, roughness corrected surface relaxivity ($\rho_{LSCM}$) can be calculated based on based on the surface roughness (R) using Equation (16) described in detail above.

At block 416, a Padé D-$T_2$ fit line is determined in the D-$T_2$ map (based on the roughness corrected surface relaxivity) that is nearest a peak of distribution of the NMR response. For example, with reference to FIGS. 1A-1B, a computer at the surface of the wellbore 116 can make this determination. With reference to FIG. 3, the Padé D-$T_2$ fit is the line 310 that intersects the peak of distribution (312). In some embodiments, the Padé D-$T_2$ fit is created based on Equation (6) set forth above. In Equation (6), all the terms can be known except the cementation exponent, m. Thus, cementation exponent, m, can be set for Equation (6) such that the line intersects or is nearest the peak 312. The peak 312 can be defined as the maximum intensity of the signal amplitude of the NMR response. The Padé D-$T_2$ fit line 310 that passes through the peak 312 can be selected because it is considered the best fit to the D-$T_2$ distribution (i.e., that goes through a peak 312 of the distribution). In this example, the value of m for the fit line 310 is 2.02 µm/s. So the value of m can be 2.

At block 418, the Archie cementation exponent (m) for the Padé D-$T_2$ fit line in the D-$T_2$ map and the surface relaxivity is determined. For example, with reference to FIGS. 1A-1B, a computer at the surface of the wellbore 116 can make this determination. As described above, Equation (6) can used to determine the Archie cementation exponent (m) for the Padé D-$T_2$ fit such that the line intersects or is nearest the peak of the distribution.

At block 420, formation evaluation based on the Archie cementation exponent is performed. For example, with reference to FIGS. 1A-1B, a computer at the surface of the wellbore 116 can make perform the formation evaluation. For instance, the computer can determine porosity, permeability, saturation, etc. based on Archie's law and the Archie cementation exponent.

At block 422, a wellbore operation is adjusted based on the formation evaluation. For example, with reference to FIGS. 1A-1B, a computer at the surface of the wellbore 116 can perform this operation. For instance, drilling operations (such as direction, speed of the drill bit, weight on bit, etc.) can be adjusted based on the formation evaluation. Other wellbore operations can also be adjusted. For example, post drilling operations (such as production-related operations) can be adjusted based on the formation evaluation. For example, different parameters of a fracking operation can be adjusted based on the formation evaluation. Operations of the flowchart 400 are complete.

Figure 5:
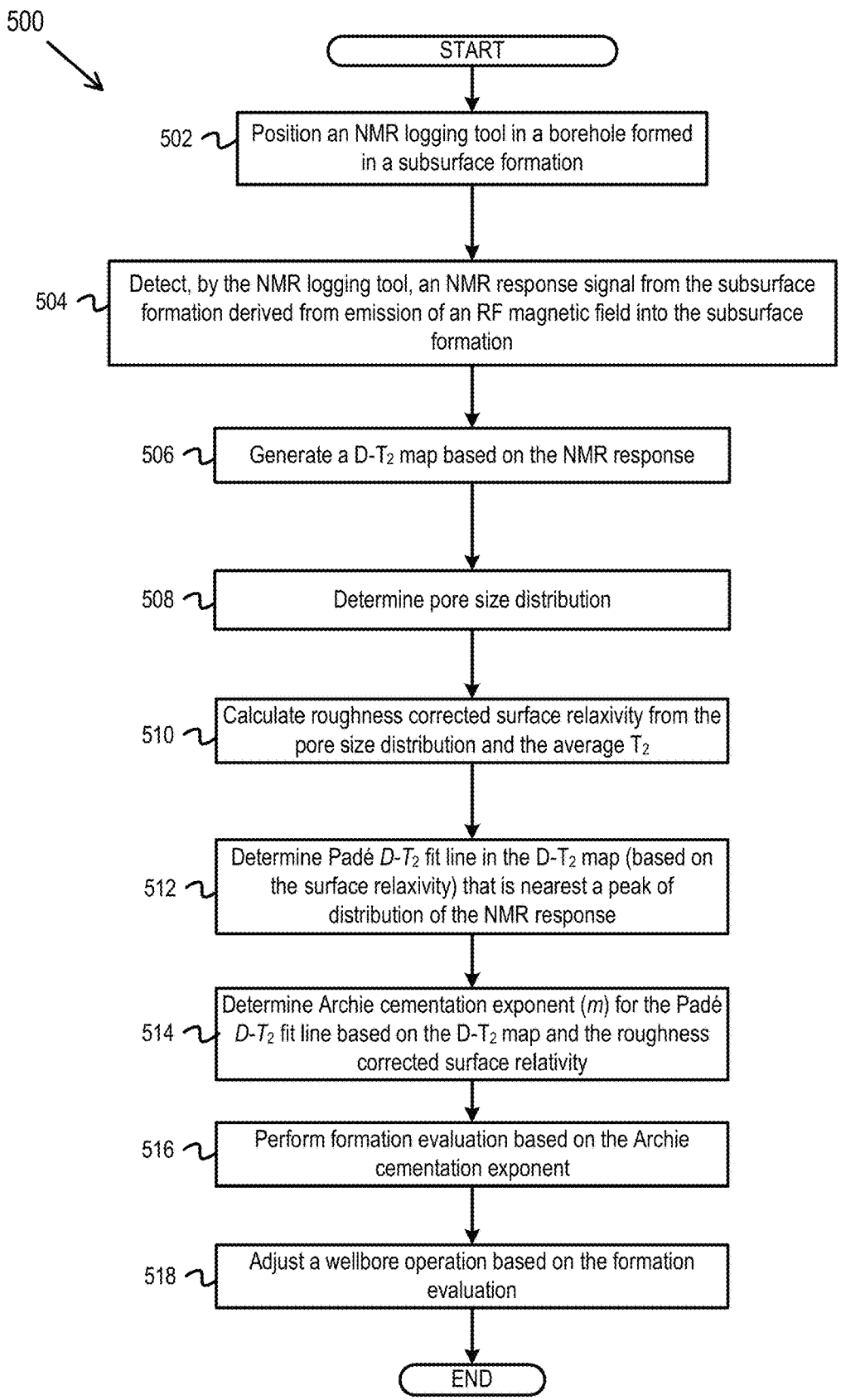
FIG. 5 depicts a flowchart of example operations for determining and using the Archie cementation exponent based on an NMR response using micro-Computed Topography (u-CT) to determine pore size distribution of the formation, according to some embodiments.

A third example of operations for determining and using the Archie cementation exponent based on an NMR response is now described. In particular, FIG. 5 depicts a flowchart of example operations for determining and using the Archie cementation exponent based on an NMR response using micro-Computed Topography (µ-CT) to determine pore size distribution of the formation, according to some embodiments. FIG. 5 depicts a flowchart 500 can be performed by software, firmware, hardware or a combination thereof. Such operations are described with reference to the systems of FIGS. 1A-1B. However, such operations can be performed by other systems or components. For example, at least some of the operations of the flowchart 500 are described as being performed by a computer at a surface of the wellbore. In some embodiments, one or more of these operations can be performed by a computer downhole in the wellbore. For example, the NMR logging tool 126 or the wireline logging tool 134 can include a computer to perform one or more of these operations. The operations of the flowchart 500 start at block 502.

At block 502, an NMR logging tool is positioned in a wellbore formed in a subsurface formation. For example, with reference to FIGS. 1A-1B, the NMR logging tool 126 or the wireline logging tool 134 can be positioned in the wellbore 116 where NMR logging is to be performed.

At block 504, an NMR response is detected by the NMR logging tool and from the subsurface formation. The NMR response can be derived from emission of a radio frequency (RF) magnetic field into the subsurface formation. For example, with reference to FIGS. 1A-1B, the NMR logging tool 126 or the wireline logging tool 134 can emit the RF magnetic field into the subsurface formation.

At block 506, a D-$T_2$ map is generated based on the NMR response. For example, with reference to FIGS. 1A-1B, a computer at the surface of the wellbore 116 can generate the D-$T_2$ map (as described above in reference to FIG. 3).

At block 508, pore size distribution is determined. For example, with reference to FIGS. 1A-1B, a computer at the surface of the wellbore 116 can perform this operation. As described above, assuming spherical pores, the surface relaxivity can be determined from the from μ-CT.

At block 510, surface relaxivity is calculated from the pore size distribution and the average $T_2$. For example, with reference to FIGS. 1A-1B, a computer at the surface of the wellbore 116 can perform this operation. For instance, the surface relaxivity can be calculated from the pore size distribution using Equation (16) described in detail above.

At block 512, a Padé D-$T_2$ fit line is determined in the D-$T_2$ map that is nearest a peak of distribution of the NMR response. For example, with reference to FIGS. 1A-1B, a computer at the surface of the wellbore 116 can make this determination. With reference to FIG. 3, the Padé D-$T_2$ fit is the line 310 that intersects the peak of distribution (312). In some embodiments, the Padé D-$T_2$ fit line is created based on Equation (6) set forth above. In Equation (6), all the terms can be known except the cementation exponent, m. Thus, cementation exponent, m, can be set for Equation (6) such that the line intersects or is nearest the peak 312. The peak 312 can be defined as the maximum intensity of the signal amplitude of the NMR response. The Padé D-$T_2$ fit line 310 that passes through the peak 312 can be selected because it is considered the best fit to the D-$T_2$ distribution (i.e., that goes through a peak 312 of the distribution). In this example, the value of m for the best fit line 310 is 2.02 μm/s. So the value of m can be 2.

At block 514, the Archie cementation exponent (m) for the Padé D-$T_2$ fit line in the D-$T_2$ map and the surface relaxivity is determined. For example, with reference to FIGS. 1A-1B, a computer at the surface of the wellbore 116 can make this determination. As described above, Equation (6) can used to determine the Archie cementation exponent (m) for the Padé D-$T_2$ fit such that the fit line intersects or is nearest the peak of the distribution.

At block 516, formation evaluation based on the Archie cementation exponent is performed. For example, with reference to FIGS. 1A-1B, a computer at the surface of the wellbore 116 can make perform the formation evaluation. For instance, the computer can determine porosity, permeability, saturation, etc. based on Archie's law and the Archie cementation exponent.

At block 518, a wellbore operation is adjusted based on the formation evaluation. For example, with reference to FIGS. 1A-1B, a computer at the surface of the wellbore 116 can perform this operation. For instance, drilling operations (such as direction, speed of the drill bit, weight on bit, etc.) can be adjusted based on the formation evaluation. Other wellbore operations can also be adjusted. For example, post drilling operations (such as production-related operations) can be adjusted based on the formation evaluation. For example, different parameters of a fracking operation can be adjusted based on the formation evaluation. Operations of the flowchart 500 are complete.

Figure 6:
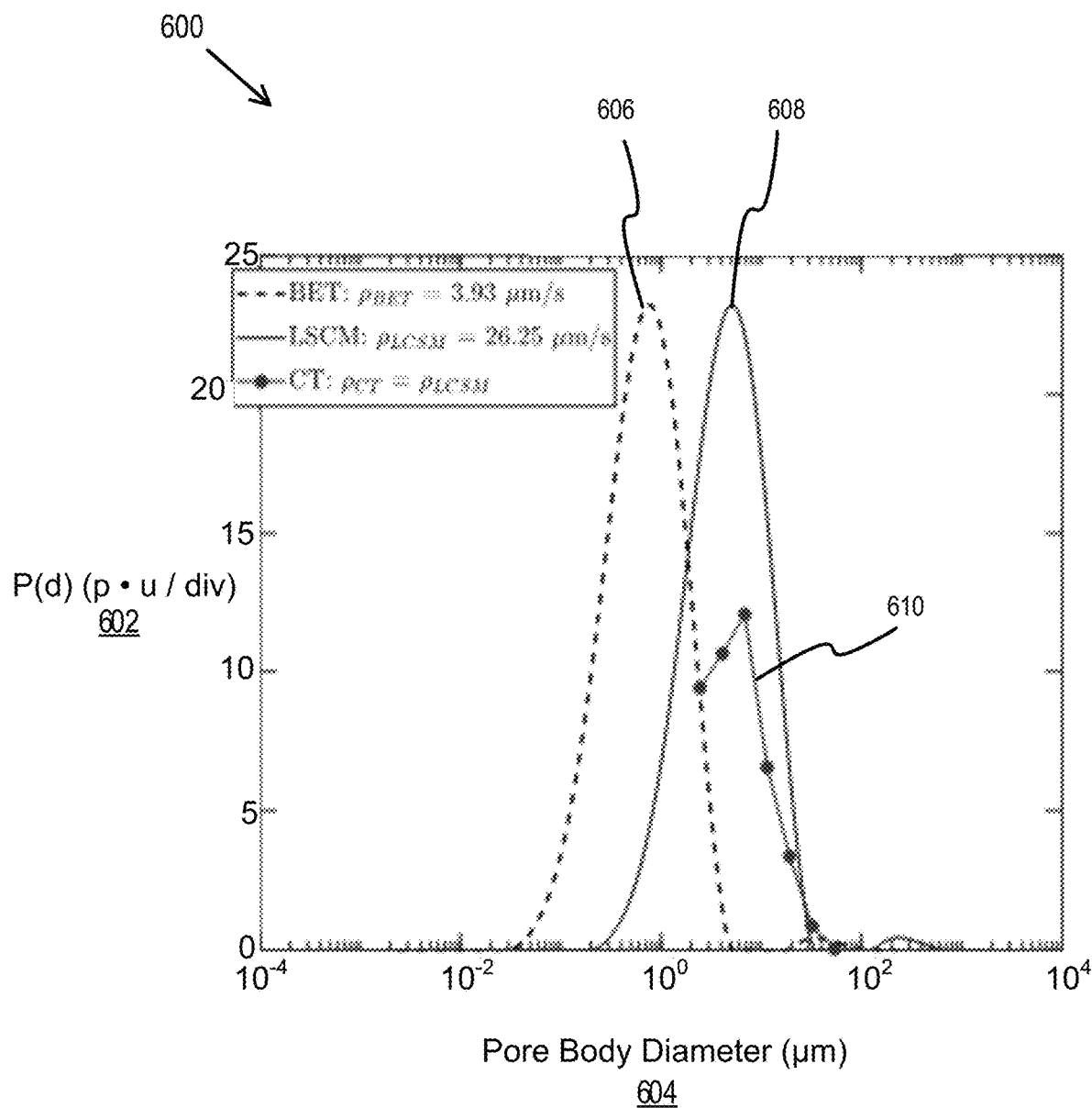
FIG. 6 depicts an example graph of showing that the roughness corrected BET surface relaxivity and the μ-CT surface relaxivity provide similar results, according to some embodiments.

As described, there are multiple approaches for determining surface relaxivity. The three approaches described herein provide similar results. To illustrate, FIG. 6 depicts an example graph of showing that the roughness corrected BET surface relaxivity and the p-CT surface relaxivity provide similar results, according to some embodiments. A graph 600 of FIG. 6 includes a y-axis 602 that is the pore size distribution and an x-axis 604 that is the pore body diameter.

A line 606 is the surface relaxivity using BET ($\rho_{BET}$). Lines 608 and 610 perform different corrections of $\rho_{BET}$ with similar results. The line 608 is the surface relaxivity that includes a correctness for roughness ($\rho_{LSCM}$) that is used in the operations of FIG. 5. A line 610 is the surface relaxivity that is determined based on p-CT that is used in the operations of FIG. 4.

The flowcharts herein are annotated with a series of numbers. These numbers represent stages of operations. Although these stages are ordered for this example, the stages illustrate one example to aid in understanding this disclosure and should not be used to limit the claims. Subject matter falling within the scope of the claims can vary with respect to the order and some of the operations. The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Example Computer

Figure 7:
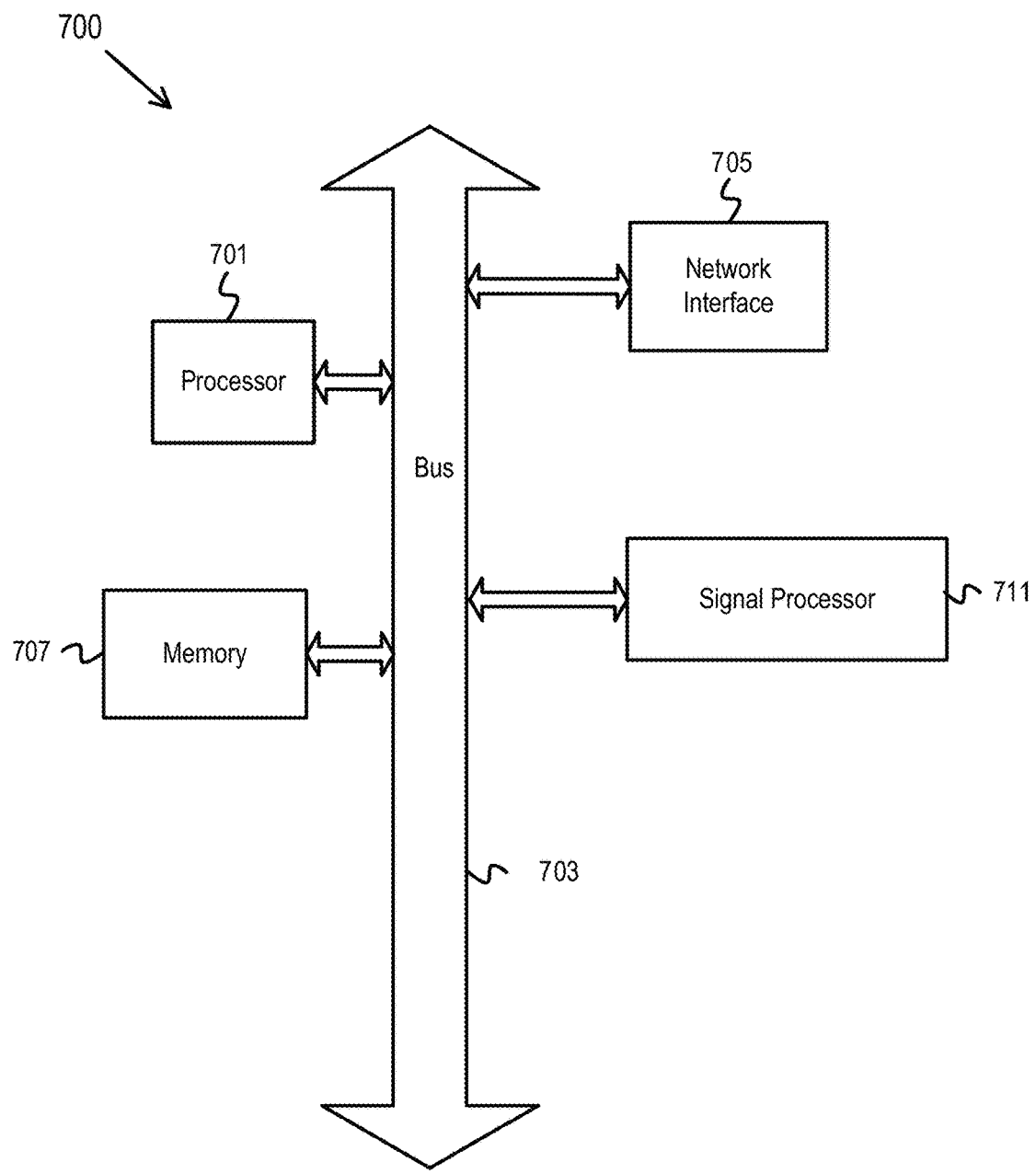
FIG. 7 depicts an example computer, according to some embodiments.

FIG. 7 depicts an example computer, according to some embodiments. A computer 700 includes a processor 701 (possibly including multiple processors, multiple cores, multiple nodes, and/or implementing multi-threading, etc.). The computer 700 includes a memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer 700 also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.).

The computer 700 also includes a signal processor 711. The signal processor 711 can perform at least of a portion of the operations described herein. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques as described herein may be implemented with facilities consistent with any hardware system or hardware systems. Many variations, modifications, additions, and improvements are possible.

EXAMPLE EMBODIMENTS

Embodiment #1

A method comprises determining a Nuclear Magnetic Resonance (NMR) response of a subsurface formation that is based on an NMR response signal that traversed through the subsurface formation and that is result of a magnetic field being emitted into the subsurface formation; determining an Archie cementation exponent for an Archie equation based on the NMR response; and determining a property of the subsurface formation based on the Archie cementation exponent.

Embodiment #2

The method of Embodiment 1, wherein determining the Archie cementation exponent comprises determining the Archie cementation exponent using an NMR diffusion relaxation distribution map that is generated from the NMR response.

Embodiment #3

The method of Embodiment 2, wherein determining the Archie cementation exponent using the NMR diffusion relaxation distribution map comprises performing a phenomenological fit to restricted-diffusion versus T2 that is positioned closest to a peak of a distribution of the NMR response.

Embodiment #4 the method of any one of embodiments 1-3, further comprising determining a surface relaxivity of the subsurface formation.

Embodiment #5

The method of Embodiment 4, wherein determining the Archie cementation exponent comprises determining the Archie cementation exponent for a Padé D-$T_2$ fit line and the surface relaxivity of the subsurface formation.

Embodiment #6

The method of any one of Embodiments 1-5, wherein determining the property of the subsurface formation comprises determining at least one of a conductivity and resistivity of the subsurface formation.

Embodiment #7

The method of any one of Embodiments 1-6, further comprising adjusting a wellbore operation for a wellbore that is formed in the subsurface formation.

Embodiment #8

One or more non-transitory machine-readable storage media comprising program code executable by a processor to cause the processor to: determine a Nuclear Magnetic Resonance (NMR) response of a subsurface formation that is based on an NMR response signal that traversed through the subsurface formation and that is result of a magnetic field being emitted into the subsurface formation; determine an Archie cementation exponent for an Archie equation based on the NMR response; and determine a property of the subsurface formation based on the Archie cementation exponent.

Embodiment #9

The one or more non-transitory machine-readable storage media of Embodiment 8, wherein the program code executable by the processor to cause the processor to determine the Archie cementation exponent comprises program code executable by the processor to cause the processor to determine the Archie cementation exponent using an NMR diffusion relaxation distribution map that is generated from the NMR response.

Embodiment #10

The one or more non-transitory machine-readable storage media of Embodiment 9, wherein the program code to executable by the processor to cause the processor to determine the Archie cementation exponent using the NMR diffusion relaxation distribution map comprises program code executable by the processor to cause the processor to select a phenomenological fit to restricted-diffusion versus T2 that is positioned closest to a peak of a distribution of the NMR response.

Embodiment #11

The one or more non-transitory machine-readable storage media of any one of Embodiments 8-10, wherein the program code comprises program code executable by the processor to cause the processor to determine a surface relaxivity of the subsurface formation.

Embodiment #12

The one or more non-transitory machine-readable storage media of Embodiment 11, wherein the program code to executable by the processor to cause the processor to determine the Archie cementation exponent comprises program code to executable by the processor to cause the processor to determine the Archie cementation exponent for a Padé D-$T_2$ fit line and the surface relaxivity of the subsurface formation.

Embodiment #13

The one or more non-transitory machine-readable storage media of any one of Embodiments 8-12, wherein the program code executable by the processor to cause the processor to determine the property of the subsurface formation comprises program code executable by the processor to cause the processor to determine at least one of a conductivity and resistivity of the subsurface formation.

Embodiment #14

The one or more non-transitory machine-readable storage media of Embodiment 8, wherein the program code comprises program code executable by the processor to cause the processor to adjust a wellbore operation for a wellbore that is formed in the subsurface formation.

Embodiment #15

A system comprising: a Nuclear Magnetic Resonance (NMR) logging tool to be positioned in a wellbore formed in a subsurface formation, the NMR logging tool to detect an NMR response signal that traversed through the subsurface formation and that is result of a magnetic field being emitted into the subsurface formation; a processor; and a machine-readable storage medium comprising program code executable by the processor to cause the processor to: determine an NMR response of the subsurface formation based on the NMR response signal; determine an Archie cementation exponent for an Archie equation based on the NMR response; and determine a property of the subsurface formation based on the Archie cementation exponent.

Embodiment #16

The system of Embodiment 15, wherein the program code executable by the processor to cause the processor to determine the Archie cementation exponent comprises program code executable by the processor to cause the processor to determine the Archie cementation exponent using an NMR diffusion relaxation distribution map that is generated from the NMR response.

Embodiment #17

The system of Embodiment 16, wherein the program code to executable by the processor to cause the processor to determine the Archie cementation exponent using the NMR diffusion relaxation distribution map comprises program code executable by the processor to cause the processor to select a phenomenological fit to restricted-diffusion versus T2 that is positioned closest to a peak of a distribution of the NMR response.

Embodiment #18

The system of any one of Embodiments 15-17, wherein the program code comprises program code executable by the processor to cause the processor to determine a surface relaxivity of the subsurface formation.

Embodiment #19

The system of Embodiment 18, wherein the program code to executable by the processor to cause the processor to determine the Archie cementation exponent comprises program code to executable by the processor to cause the processor to determine the Archie cementation exponent for a Padé D-$T_2$ fit line and the surface relaxivity of the subsurface formation.

Embodiment #20

The system of any one of Embodiments 15-19, wherein the program code comprises program code executable by the processor to cause the processor to adjust a wellbore operation for the wellbore that is formed in the subsurface formation.

As used herein, the term "or" is inclusive unless otherwise explicitly noted. Thus, the phrase "at least one of A, B, or C"

is satisfied by any element from the set {A, B, C} or any combination thereof, including multiples of any element.

What is claimed is:

1. A method comprising:

determining, via a Nuclear Magnetic Resonance (NMR) logging instrument, a first NMR response of a subsurface formation that is based on an NMR response signal that traversed through the subsurface formation as a result of a magnetic field being emitted into the subsurface formation;

generating, during a wellbore operation, an NMR diffusion relaxation distribution map based, at least in part, on the first NMR response;

determining a value of a surface relaxivity of the subsurface formation, wherein determining the value of the surface relaxivity comprises determining a roughness corrected surface relaxivity of the subsurface formation based on a Brunauer, Emmett, and Teller (BET) surface relaxivity, a T2 distribution, and a Laser Confocal Scanning Microscope (LSCM) surface roughness measurement;

determining an Archie cementation exponent for an Archie equation based on both the NMR diffusion relaxation distribution map and the roughness corrected surface relaxivity, wherein determining the Archie cementation exponent comprises determining the Archie cementation exponent based on a D-T2 fit line;

determining a property of the subsurface formation using the Archie cementation exponent determined based on both the NMR diffusion relaxation distribution map and the roughness corrected surface relaxivity; and adjusting the wellbore operation for a wellbore that is formed in the subsurface formation based on the property.

2. The method of claim 1, wherein determining the Archie cementation exponent using the NMR diffusion relaxation distribution map comprises performing a phenomenological fit to restricted-diffusion versus T2 that is positioned closest to a peak of a distribution of the first NMR response.

3. The method of claim 1, further comprising determining the roughness corrected surface relaxivity of the subsurface formation based on the T2 distribution and a Brunauer, Emmett, and Teller (BET) surface area measurement, wherein the BET surface relaxivity is determined based on the Brunauer, Emmett, and Teller surface area measurement.

4. One or more non-transitory machine-readable storage media including instructions executable by a processor, the instructions comprising:

instructions to determine, via a Nuclear Magnetic Resonance (NMR) logging instrument, a first NMR response of a subsurface formation that is based on an NMR response signal that traversed through the subsurface formation and that is a result of a magnetic field being emitted into the subsurface formation;

instructions to generate, during a wellbore operation, an NMR diffusion relaxation distribution map based, at least in part, on the first NMR response;

instructions to determine a value of a surface relaxivity of the subsurface formation, wherein the instructions to determine the value of the surface relaxivity comprise instructions to determine a roughness corrected surface relaxivity of the subsurface formation based on a Brunauer, Emmett, and Teller (BET) surface relaxivity, a T2 distribution, and a Laser Confocal Scanning Microscope (LSCM) surface roughness measurement;

instructions to determine an Archie cementation exponent for an Archie equation based on both the NMR diffusion relaxation distribution map and the roughness corrected surface relaxivity, wherein the instructions to determine the Archie cementation exponent comprise instructions to determine the Archie cementation exponent based on a D-T2 fit line;

instructions to determine a property of the subsurface formation using the Archie cementation exponent determined based on both the NMR diffusion relaxation distribution map and the roughness corrected surface relaxivity; and instructions to adjust the wellbore operation for a wellbore that is formed in the subsurface formation based on the determined property.

5. The one or more non-transitory machine-readable storage media of claim 4, wherein the instructions to determine the Archie cementation exponent using the NMR diffusion relaxation distribution map comprise instructions to select a phenomenological fit to restricted-diffusion versus T2 that is positioned closest to a peak of a distribution of the first NMR response.

6. The one or more non-transitory machine-readable storage media of claim 4, further comprising instructions to determine the roughness corrected surface relaxivity of the subsurface formation based on the T2 distribution and a Brunauer, Emmett, and Teller (BET) surface area measurement, wherein the BET surface relaxivity is determined based on the Brunauer, Emmett, and Teller surface area measurement.

7. The one or more non-transitory machine-readable storage media of claim 4, wherein the instructions to determine the property of the subsurface formation comprise instructions to determine at least one of a conductivity or a resistivity of the subsurface formation.

8. A system comprising:

a Nuclear Magnetic Resonance (NMR) logging tool to be positioned in a wellbore formed in a subsurface formation, the NMR logging tool to detect an NMR response signal that traversed through the subsurface formation and that is result of a magnetic field being emitted into the subsurface formation;

a processor; and a machine-readable storage medium including instructions executable by the processor, the instructions comprising:

instructions to control the NMR logging tool to determine a first NMR response of the subsurface formation based on the NMR response signal;

instructions to generate, during a wellbore operation, an NMR diffusion relaxation distribution map based, at least in part, on the first NMR response;

instructions to determine a value of a surface relaxivity of the subsurface formation, wherein the instructions to determine the value of the surface relaxivity comprise instructions to determine a roughness corrected surface relaxivity of the subsurface formation based on a Brunauer, Emmett, and Teller (BET) surface relaxivity, a T2 distribution, and a Laser Confocal Scanning Microscope (LSCM) surface roughness measurement;

instructions to determine an Archie cementation exponent for an Archie equation based on both the NMR diffusion relaxation distribution map and the roughness corrected surface relaxivity of the subsurface formation, wherein the instructions to determine the Archie cementation exponent comprise instructions to determine the Archie cementation exponent based on a D-T2 fit line;

instructions to determine a property of the subsurface formation using the Archie cementation exponent determined based on both the NMR diffusion relaxation distribution map and the roughness corrected surface relaxivity; and instructions to adjust the wellbore operation for the wellbore that is formed in the subsurface formation based on the determined property.

9. The system of claim 8, wherein the instructions to determine the Archie cementation exponent using the NMR diffusion relaxation distribution map comprise instructions to select a phenomenological fit to restricted-diffusion versus T2 that is positioned closest to a peak of a distribution of the first NMR response.

10. The system of claim 8, further comprising instructions to determine the value of the roughness corrected surface relaxivity of the subsurface formation based on the T2 distribution and a Brunauer, Emmett, and Teller (BET) surface area measurement, wherein the BET surface relaxivity is determined based on the Brunauer, Emmett, and Teller surface area measurement.

11. The method of claim 1, further comprising determining the value of the surface relaxivity of the subsurface formation based on values available in a database or library for one or more rock types of the subsurface formation.

12. The one or more non-transitory machine-readable storage media of claim 4, further comprising instructions to determine the value of the surface relaxivity of the subsurface formation based on values available in a database or library for one or more rock types of the subsurface formation.

13. The system of claim 8, further comprising instructions to determine the value of the surface relaxivity of the subsurface formation based on values available in a database or library for one or more rock types of the subsurface formation.

14. The method of claim 1, further comprising:
determining the value of the surface relaxivity of the subsurface formation based on the T2 distribution and a first pore size distribution, wherein the first pore size distribution is a micro-computed tomography (CT) pore size distribution.

15. The one or more non-transitory machine-readable storage media of claim 4, further comprising:

instructions to determine the value of the surface relaxivity of the subsurface formation based on the T2 distribution and a first pore size distribution, wherein the first pore size distribution is a micro-computed tomography (CT) pore size distribution.

16. The system of claim 8, further comprising:
instructions to determine the value of the surface relaxivity of the subsurface formation based on the T2 distribution and a first pore size distribution, wherein the first pore size distribution is a micro-computed tomography (CT) pore size distribution.

17. The method of claim 1, further comprising:
creating the D-T2 fit line based on:

$$D(T_{2S})/D_0 = 1 - \gamma \alpha L_D / \alpha L_D + \gamma$$

wherein $$\gamma = 1 - D_\infty / D_0 = 1 - 1/\tau = 1 - \varnothing^{m-1}$$

$$L_D = \sqrt{D_0 t_D}$$

$$\alpha = 4/9\sqrt{\pi} \, 1/T_{2S} \rho_{DT_2}$$

wherein $D_0$ is a bulk diffusion coefficient, wherein $D_\infty$ is $D(t)$ in a tortuosity limit, and $t_D$ is a diffusion time.

18. The method of claim 1, further comprising:
determining at least one of a resistivity or a conductivity of the subsurface formation using the Archie cementation exponent determined based on both the NMR diffusion relaxation distribution map and the roughness corrected surface relaxivity.

19. The one or more non-transitory machine-readable storage media of claim 4, further comprising:
instructions to determine at least one of a resistivity or a conductivity of the subsurface formation using the Archie cementation exponent determined based on both the NMR diffusion relaxation distribution map and the roughness corrected surface relaxivity.

20. The system of claim 8, further comprising:
instructions to determine at least one of a resistivity or a conductivity of the subsurface formation using the Archie cementation exponent determined based on both the NMR diffusion relaxation distribution map and the roughness corrected surface relaxivity.

* * * * *